(12) United States Patent
Tani

(10) Patent No.: US 7,058,391 B2
(45) Date of Patent: Jun. 6, 2006

(54) CELLULAR TELEPHONE SET, DIAL LOCK RELEASING METHOD USED IN THE SAME AND PROGRAM THEREFOR

(75) Inventor: Yukiko Tani, Saitama (JP)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 10/690,621

(22) Filed: Oct. 23, 2003

(65) Prior Publication Data

US 2004/0082322 A1    Apr. 29, 2004

(30) Foreign Application Priority Data

Jun. 11, 2002    (JP) .............................. 2002/321930

(51) Int. Cl.
*H04M 1/66* (2006.01)
*H04B 1/38* (2006.01)
*G05B 19/00* (2006.01)
*B60R 25/00* (2006.01)

(52) U.S. Cl. ...................... 455/411; 455/565; 455/566; 340/5.22; 340/5.73

(58) Field of Classification Search ................ 455/411, 455/565, 566; 709/206; 340/5.22, 5.37, 340/572.1; 379/188
See application file for complete search history.

(56) References Cited

U.S. PATENT DOCUMENTS 4,099,033 A * 7/1978 Murray ........................ 379/188
4,436,957 A * 3/1984 Mazza et al. ................ 455/411
4,724,537 A * 2/1988 Monet ......................... 455/565
5,337,345 A * 8/1994 Cassidy et al. ............. 455/410
5,495,520 A * 2/1996 Kojima ........................ 455/411

(Continued)

FOREIGN PATENT DOCUMENTS

| EP | 1 107 623 | 6/2001 |
|----|-----------|--------|
| WO | WO 99/44380 | 9/1999 |
| WO | WO 01/11851 | 2/2001 |

OTHER PUBLICATIONS

"Dial Lock for Preventing Malfunction", Instruction Manual, Chapter of Basic, pp. 252-255, (Apr. 2002).

(Continued)

*Primary Examiner*—William Trost
*Assistant Examiner*—Kiet Doan
(74) *Attorney, Agent, or Firm*—Whitman, Curtis, Christofferson & Cook, PC

(57) ABSTRACT

A cellular telephone set is capable of allowing release dial lock function by a child even when parent manages an identification number. A control portion of the cellular telephone set is responsive to input of identification number through a key operating portion after dial lock condition is established by dial lock means to make judgment whether the input identification number is a dial lock releasing number in a dial lock releasing number storage region. When the control portion makes judgment that the identification number is the dial lock releasing number, dial lock condition of a predetermined function preliminarily set in an identification number setting information storage region is released.

19 Claims, 4 Drawing Sheets

U.S. PATENT DOCUMENTS

| | | | |
|---|---|---|---|
| 5,646,604 A * | 7/1997 | Maruyama et al. | 340/5.22 |
| 6,075,983 A | 6/2000 | Kumagai | |
| 6,138,039 A * | 10/2000 | Sudo et al. | 455/566 |
| 6,198,948 B1 * | 3/2001 | Sudo et al. | 455/566 |
| 6,757,376 B1 * | 6/2004 | Yoon | 379/355.01 |
| 6,842,105 B1 * | 1/2005 | Henderson et al. | 340/5.73 |
| 2002/0129109 A1 * | 9/2002 | Nozaki et al. | 709/206 |
| 2002/0158761 A1 * | 10/2002 | Runyon et al. | 340/572.1 |
| 2003/0139192 A1 | 7/2003 | Chmaytelli et al. | |

OTHER PUBLICATIONS

"About Identification Number" Instruction Manual, Chapter of Basic, pp. 248-249, (Apr. 2002).

European Search Report dated Jan. 26, 2004.

Chinese Office Action dated Jan. 21, 2005 with English translation.

* cited by examiner

CELLULAR TELEPHONE SET, DIAL LOCK RELEASING METHOD USED IN THE SAME AND PROGRAM THEREFOR

CROSS REFERENCE TO THE RELATED APPLICATION

The present application has been filed with claiming priority based on Japanese Patent Application No. 2002-321930, filed on Nov. 6, 2002. Disclosure of the above-identified Japanese Patent Application is herein incorporated by reference.

BACKGROUND OF THE INVENTION

1. Field of the Invention

The present invention relates to a cellular telephone set, a dial lock releasing method to be used in the same, and a program therefor. More particularly, the invention relates to a method for releasing dial lock for disabling key input in the cellular telephone set.

2. Description of the Related Art

Conventionally, in the cellular telephone set, there is provided a dial lock function for disabling key input except for entry of a personal identification number (terminal identification number) so as to prevent unauthorized use by others as stolen or lost by unconsciously leaving or to avoid erroneous key input as stored in a bag and so forth, as disclosed in "dial lock for preventing malfunction", NTT Docomo (registered trademark) Mova(registered trademark) N504i Instruction Manual, Chapter of Basic, pages 252 to 255, April, 2002.

In such cellular telephone set, the dial lock function becomes active by depressing a preliminarily set combination of keys or by selecting item of the dial lock function among an operation menu or setting menu to instantly disable key input except for entry of the identification number. Namely, in the conventional cellular telephone, by inputting the identification number under a condition where key input is disabled, dial lock function becomes null (released) to enable key input.

In addition to releasing of the dial lock function, the identification number may be used for setting various functions of the cellular telephone set, such as "changing of terminal identification number", "setting of telephone number". "setting of inhibited operation", "setting into secret mode", "setting into secret only mode", "setting operation in response to number not notifying call", "resetting of setting", "setting of telephone directory designation", "setting of calling destination", "setting of mail security", "setting of history display" and so forth, as disclosed in "About Identification Number", NTT Docomo (registered trademark), Mova(registered trademark) N504i Instruction Manual, Chapter of Basic, pages 248 to 249, April, 2002.

In the foregoing conventional cellular telephone set, dial lock function is installed for preventing unauthorized use as lost or malfunction as stored, the identification number is used for releasing the dial lock function.

However, only one identification number can be used in one terminal, if parent buys the cellular telephone set for their child and manages the identification number, and dial lock function becomes active unintentionally, the child may not release dial lock function.

On the other hand, when the child manages the identification number, while the child may use all of the functions provided for the cellular telephone set, it becomes impossible to prevent increasing of frequency of accessing of payable contents on the internet and/or using of electronic mails and thus increasing of charge due to expansion of communication period and so forth. Therefore, the parent may not control the charge for the cellular telephone set.

SUMMARY OF THE INVENTION

The present invention has been worked out in view of the drawback in the prior art set forth above. It is therefore an object of the present invention to provide a cellular telephone set which permits child to release dial lock function even when parent manage an identification number, a dial lock releasing method to be used in the same and a program therefor.

Another object of the present invention is to provide a cellular telephone set for permitting parent to control charge for the cellular telephone set, a dial lock releasing method to be used in the same and a program therefor.

According to one aspect of the present invention, a cellular telephone set being set and releases of various function when an input identification number is judged as correct identification number including dial lock for disabling key input, comprises:

holding means for holding a preliminarily set dial lock releasing number dedicated for releasing dial lock;

judgment means for making judgment whether the input identification number input in dial lock condition is the dial lock releasing number held in the holding means; and means for releasing dial lock condition when the judgment means makes judgment that the input identification number is the dial lock releasing number.

According to the preferred construction, functions to be released dial lock condition by the dial lock releasing number can be set arbitrarily.

According to another aspect of the present invention, a dial lock releasing method in a cellular telephone set being set and releases of various function when an input identification number is judged as correct identification number including dial lock for disabling key input, comprises:

step of making judgment whether the input identification number input in dial lock condition is a dial lock releasing number a preliminarily set dial lock releasing number dedicated for releasing dial lock held in a holding means;

step of releasing dial lock condition when the judgment means makes judgment that the input identification number is the dial lock releasing number.

In the preferred dial lock releasing method functions to be released dial lock condition by the dial lock releasing number can be set arbitrarily.

According to a further aspect of the present invention, a program for performing a dial lock releasing method in a cellular telephone set being set and releases of various function when an input identification number is judged as correct identification number including dial lock for disabling key input, makes a computer executing:

process of making judgment whether the input identification number input in dial lock condition is a dial lock releasing number a preliminarily set dial lock releasing number dedicated for releasing dial lock held in a holding means;

process of releasing dial lock condition when the judgment means makes judgment that the input identification number is the dial lock releasing number.

Preferably, the program may make the computer to execute process of releasing dial lock condition of the preliminarily set function upon inputting of the dial lock releasing number.

Namely, the cellular telephone set according to the present invention permits arbitrarily set the dial lock releasing number dedicated for releasing only dial lock, in addition to the identification number to be used for setting and releasing various functions. By this, in the cellular telephone set according to the present invention, the child may release dial lock function even if the parent manages the identification number.

Also, the cellular telephone set according to the present invention permits arbitrarily setting functions to be released by the dial lock releasing number. By this, in the cellular telephone set according to the present invention, the parent may limit the use of the cellular telephone set by the child. Therefore, the parent may manage charge for the cellular telephone set.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a cellular telephone set, a dial lock releasing method to be used in the same and a program therefor according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
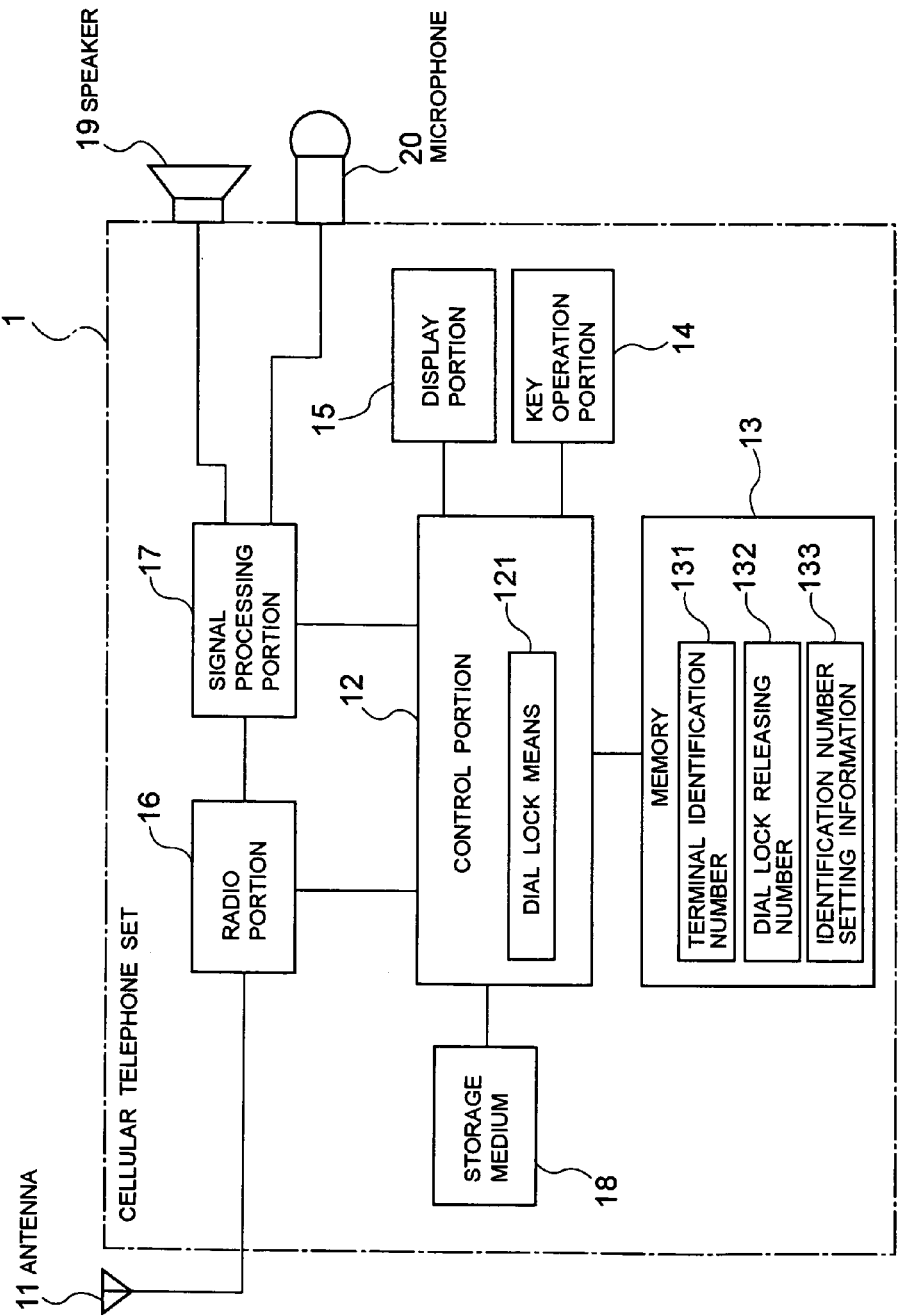
FIG. 1 is a block diagram showing one embodiment of a cellular telephone set according to the present invention.

FIG. 1 is a block diagram showing one embodiment of a cellular telephone set according to the present invention. In FIG. 1, the cellular telephone set 1 is constructed with an antenna 11, a control portion 12, a memory 13, a key operating portion 14, a display portion 15, a radio portion 16, a signal processing portion 17, a storage medium 18, a speaker 19 and a microphone 20.

The antenna 11 transmits and receives a radio wave. In the key operating portion 14, user may perform various setting, operation of an identification number or calling and call receiving operation. The display portion 15 displays an operation menu upon operation of various setting or identification number, or operation for calling and call reception.

The radio portion 16 performs process relating to radio communication. The signal processing portion 17 processes a received signal and a transmitting signal. The speaker 19 outputs a received voice, and the microphone 20 inputs a voice.

The control portion 12 is connected to the memory 13, the key operating portion 14, the display portion 15, the radio portion 16 and the signal processing portion 17, respectively to perform control for respective components. On the other hand, the control portion 12 has dial lock means 121 for performing dial lock function for the key operating portion 14 for disabling key input except for entry of the identification number.

The memory 13 stores contents of various setting, identification number and so forth. Particularly, the memory 13 has a terminal identification number storage region 131 for storing a terminal identification number, a dial lock release number storage region 132 for storing a dial lock releasing number which releases dial lock (inhibited condition) for disabling key input in the preliminarily set function, such as dial lock or the like for the key operation portion 14, and an identification number setting information storage region 133 storing information to be objective for dial lock (hereinafter referred to as identification number setting information). It should be noted that when the dial lock release number is used only for releasing of dial lock, it is not necessary to provide the identification number setting information storage region 133.

The storage medium 18 stores a program (computer executable program) for realizing processes for respective portions. The control portion 12 controls respective components set forth above by executing the program stored in the storage medium 18.

Figure 2:
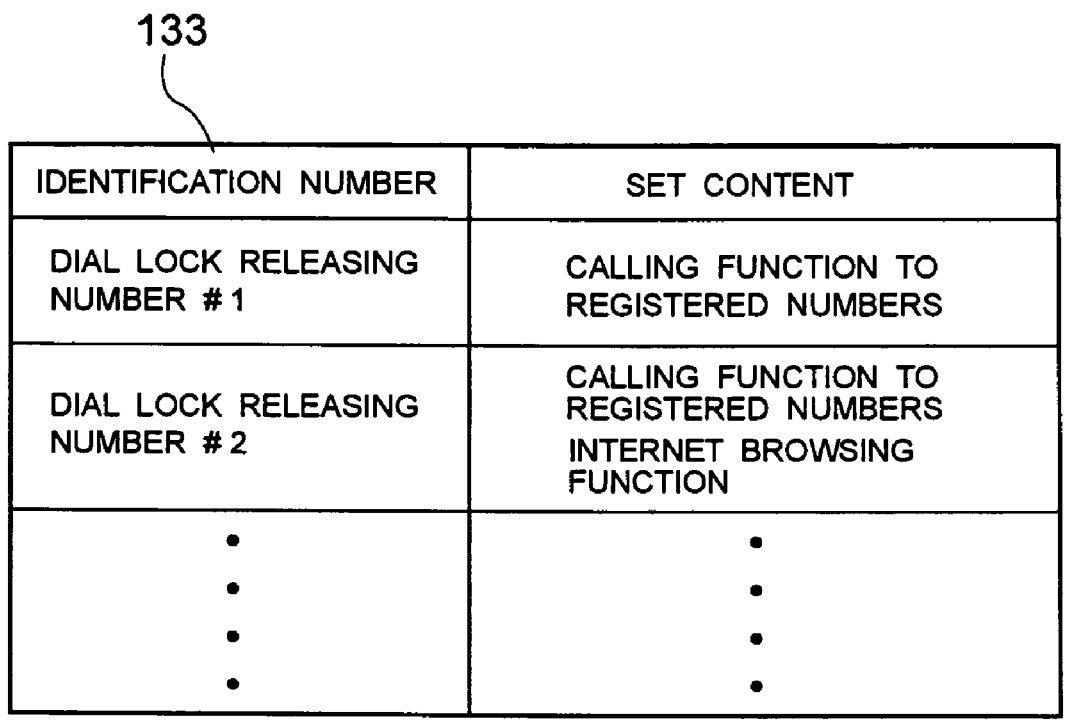
FIG. 2 is an illustration showing an example of construction of a storage region of an identification number setting information in a memory of FIG. 1.

FIG. 2 is an illustration showing an example of construction of the identification number setting information storage region 133 of the memory 13 of FIG. 1. In FIG. 2, the identification number and indicative of set contents indicating the identification number setting information corresponding to the identification number are stored in the identification number setting information storage region 133.

For example, when the identification number is a dial lock release number #1, the fact of being used for releasing dial lock condition of "calling function to registered number" is stored as set content. When the identification number is the dial lock release number #2, the fact of being used for releasing dial lock conditions of "calling function" and "internet browsing function" is stored as set contents.

It should be noted that while the dial lock release numbers #1 and #2 are stored in the identification number setting information storage region 133 in the example shown in FIG. 2, it is possible to store one, three or more dial lock release numbers in the identification number setting information storage region 133.

FIGS. 3A to 3D are illustrations showing one example of the setting procedure of the dial lock release number for one embodiment of the cellular telephone set 1 according to the present invention. The setting procedure of the embodiment is discussed herein after with referring to FIGS. 2 and 3A to 3D.

Figure 3A:
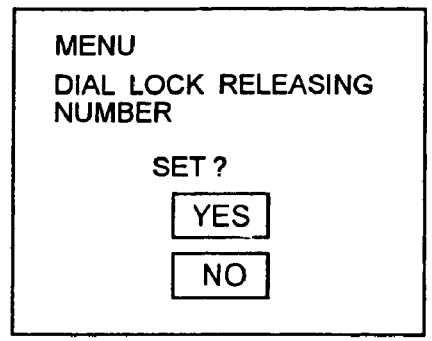
FIGS. 3A to 3D are illustrations showing one example of setting procedure of a dial lock releasing number of one embodiment of the cellular telephone set of the present invention.
Figure 3B:
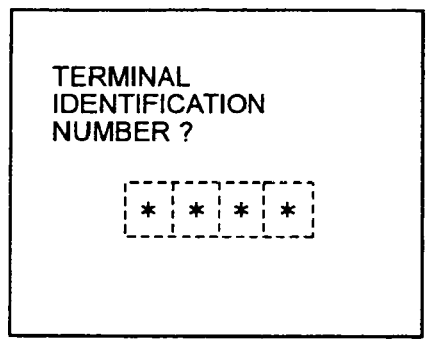
Figure 3C:
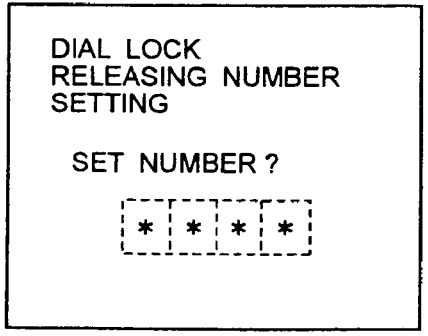

At first, when the dial lock release number of the cellular telephone set 1 is to be set, when dial lock release number setting is selected on a menu screen of the display portion 15 (see FIG. 3A), the control portion 12 displays a screen image prompting input of the terminal identification number on the setting screen image of the display portion 15 (see FIG. 3B).

When the user (parent) inputs the terminal identification number through the key operating portion 14, the control portion 12 makes judgment whether the terminal identification number is correct or not. If correct, a display screen image prompting setting of the dial lock releasing number is displayed on the setting screen image of the display portion 15 (see FIG. 3C). When the user (parent) inputs the dial lock releasing number through the key operating portion 14 on the setting screen image, the control portion 12 stores the input dial lock releasing number in the dial lock number storage region 132.

Figure 3D:
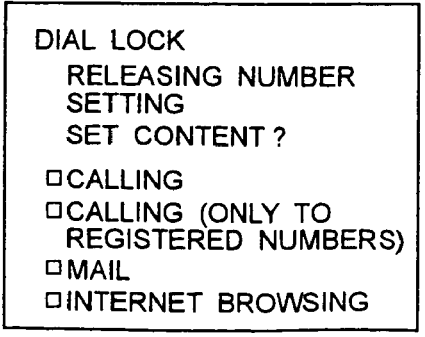

Subsequently, the control portion 12 displays a screen image for prompting setting functions (functions to situating in inhibiting condition as set forth above) for which dial lock is to be released by the dial lock releasing number, on the setting screen image of the display portion 15 (see FIG. 3D). In such setting screen image, for example, dial locking for "calling function", "calling function restricted to the preliminarily set number", "mailing function", "internet browsing function" and so forth can be set to be released by the dial lock releasing number.

On the setting screen image, if the user (parent) inputs the setting content of the dial lock releasing number through the key operating portion 14, the control portion 12 stores the dial lock releasing number and the set content in the identification number setting information storage region 133 (see FIG. 2).

Figure 4:
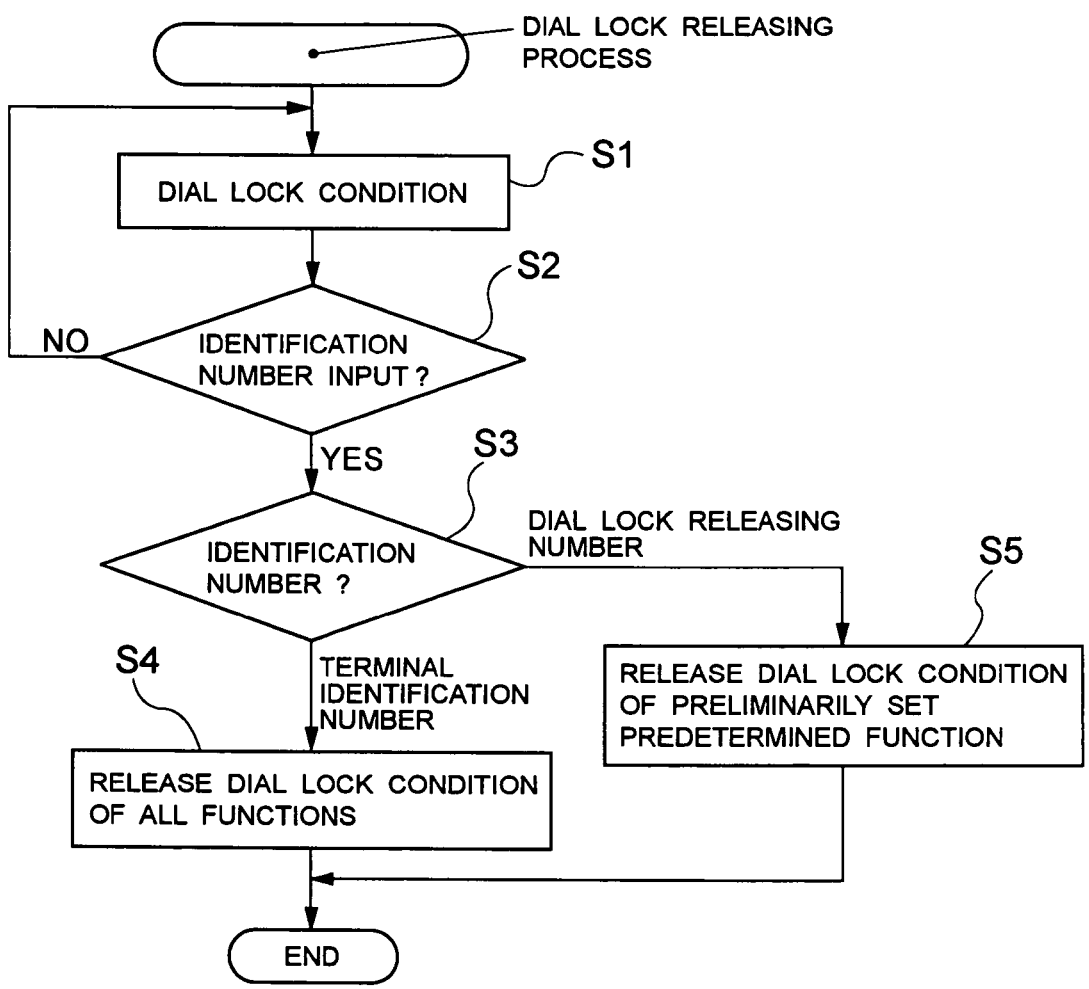
FIG. 4 is a flowchart showing an example of releasing procedure of dial lock of one embodiment of the cellular telephone set of the present invention.

FIG. 4 is a flowchart showing an example of releasing procedure of dial lock of one embodiment of the cellular telephone set 1 of the present invention. Dial lock releasing procedure of one embodiment of the cellular telephone set 1 according to the present invention will be discussed with referring to FIGS. 1 to 4. It should be noted that the process shown in FIG. 4 is realized by executing the program stored in the storage medium 18.

When preliminarily set combination of keys is depressed or the items of the dial lock function contained in the operation menu or the setting menu is selected, the control portion 12 of the cellular telephone set 1 makes the dial lock means 121 place the state of itself into dial lock state (step S1). Under the dial lock condition where only key input for entry of the identification number is enabled, and key operation for other key inputs are disabled.

The control portion 12 maintains the dial lock condition until the identification number is input under the dial lock condition (step 2 of FIG. 4). In this case, there are two modes of dial lock condition, wherein one mode of dial lock condition is to make key input for a part of functions and the other mode of dial lock condition is to make all functions.

The control portion 12 is responsive to input of the identification number (step S2 of FIG. 4) to make judgment whether the identification number is the terminal identification number stored in the terminal identification number storage region 131 or the dial lock releasing number stored in the dial lock releasing number storage region 132 (step S3 of FIG. 4). When the identification number is judged as the terminal identification number, the control portion 12 releases dial lock condition of all functions.

On the other hand, when the identification number is judged as the dial lock releasing number, the control portion 12 releases dial lock condition of predetermined functions preliminarily set in the identification number setting information storage region 133 (step S5 of FIG. 4). In this case, as releasing of dial lock condition of the predetermined functions may be either releasing of dial lock condition for all functions or releasing of dial lock condition for a part of functions.

For example, when the input identification number is the dial lock releasing number #1, dial lock condition of "calling function to registered numbers" is released to permit calling only the registered numbers (for example, telephone numbers of terminals used by the parents and friends). Accordingly, in case of call arrival which is cut after one or several times of ringing tone, such as "junk call", the current user (child) may not call back to the caller's telephone number unless the caller's telephone number is registered.

On the other hand, when the input identification number is the dial lock releasing number #2, dial lock conditions of "calling function to registered number" and "internet browsing function" are released to permit calling to the preliminarily set registered numbers and browsing of internet. By this, even when the user (parent) manages the identification number, the user (child) may release dial lock function, and charge for the terminal (cellular telephone set 1) can be managed by the user (parent).

As set forth above, in the shown embodiment, in addition to permit setting the identification number, by permitting arbitrarily setting the dial lock releasing number dedicated for releasing dial lock condition, even when the user (parent) manages the identification number, the user (child) may release dial lock function.

On the other hand, in the shown embodiment, by arbitrarily setting the functions for which dial lock conditions are released by the dial lock releasing number, the user (parent) may restrict use of the cellular telephone set 1 by the user (child). Therefore, the charge for the cellular telephone set 1 can be managed by the user (parent).

As set forth above, the cellular telephone set according to the present invention which performs setting and releasing of various function when the input identification number is judged as correct identification number, and can be set dial lock freely for disabling key input, holds the dial lock releasing number preliminarily set and dedicated for releasing dial lock in holding means and permits releasing of dial lock condition when the input identification number in the dial lock condition is judged as the dial lock releasing number held in the holding means. Therefore, when the parent manages the identification number, the child may release dial lock function.

On the other hand, the cellular telephone set according to the present invention permits arbitrary setting of functions which can be released dial lock condition by the dial lock releasing number, the parent may manage charge for the cellular phone set.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cellular telephone set being set and released of various functions when an input identification number is judged as a correct identification number including a dial lock for disabling key input, comprising:

holding means for holding a preliminarily set dial lock releasing number dedicated for releasing dial lock and at least a second number which releases one or more pre-programmed permitted functions wherein said at least a second number is different from said preliminarily set dial lock releasing number;

judgment means for making judgment whether the input identification number input in dial lock condition is said dial lock releasing number held in said holding means and for making judgment whether the input identification number is said at least a second number held in said holding means; and means for releasing dial lock condition when said judgment means makes judgment that said input identification number is said dial lock releasing number for releasing said one or more pre-programmed permitted functions when said judgment means makes judgment that said input identification number is said at least a second number.

2. A cellular telephone set as set forth in claim 1, wherein said one or more pre-programed permitted functions for each of a plurality of preset identification numbers can be set arbitrarily.

3. A cellular telephone set as set forth in claim 2, wherein one of said one or more pre-programed permitted functions is a calling function.

4. A cellular telephone set as set forth in claim 2, wherein one of said one or more pre-programmed permitted functions is a calling function to registered telephone numbers.

5. A cellular telephone set as set forth in claim 2, wherein one of said one or more pre-programed permitted functions is an internet browsing function.

6. A cellular telephone set as set forth in claim 2, wherein one of said one or more pre-programed permitted functions is a transmitting and receiving function of an electronic mail.

7. A cellular telephone set as set forth in claim 1, wherein a plurality of preset identification numbers can be set arbitrarily.

8. A dial lock releasing method in a cellular telephone set being set and released of various functions when an input identification number is judged as correct identification number including dial lock for disabling key input, comprising:

storing in a holding means a preliminarily set dial lock releasing number dedicated for releasing dial lock and at least a second number which releases one or more pre-programmed permitted functions wherein said at least a second number is different from said preliminarily set dial lock releasing number;

making judgment whether the input identification number input in dial lock condition is said preliminarily set dial lock releasing number dedicated for releasing dial lock held in said holding means making judgment whether the input identification number is said at least a second number held in said holding means; and releasing dial lock condition when judgment is made that said input identification number is said dial lock releasing number and releasing said one or more pre-programmed permitted functions when judgment is made that said input identification number is said at least a second number.

9. A dial lock releasing method set as set forth in claim 8, wherein said one or more pre-programed permitted functions for each of a plurality of preset identification numbers can be set arbitrarily, and further comprising the step of setting at least one of said one or more pre-programmed permitted functions.

10. A dial lock releasing method as set forth in claim 9, wherein one of said one or more pre-programed permitted functions is a calling function.

11. A dial lock releasing method as set forth in claim 9, wherein one of said one or more pre-programmed permitted functions is a calling function to registered telephone numbers.

12. A dial lock releasing method as set forth in claim 9, wherein one of said one or more pre-programed permitted functions is an internet browsing function.

13. A dial lock releasing method as set forth in claim 9, wherein one of said one or more pre-programmed permitted functions is transmitting and receiving function of an electronic mail.

14. A dial lock releasing method as set forth in claim 8, wherein a plurality of preset identification numbers can be set arbitrarily, and further comprising the step of setting one of said plurality of preset identification numbers.

15. A computer program for performing a dial lock releasing method in a cellular telephone set being set and released of various functions when an input identification number is judged as a correct identification number including dial lock for disabling key input, said computer program making a computer execute:

a process of making judgment whether the input identification number input in dial lock condition is a preliminarily set dial lock releasing number dedicated for releasing dial lock held in a holding means and a process of making judgment whether the input identification number in dial lock condition is at least a second number which releases one or more pre-programmed permitted functions wherein said at least a second number is different from said preliminarily set dial lock releasing number; and a process of releasing dial lock condition when said judgment process makes judgment that said input identification number is said dial lock releasing number and a process of releasing said one or more pre-programmed permitted functions when said judgment process makes judgment that said input identification number is said at least a second number.

16. A program as set forth in claim 15, which makes said computer execute a process of releasing dial lock condition of said one or more pre-programed permitted functions upon inputting of a corresponding one of said plurality of preset identification numbers.

17. A telephone set with a dial lock feature which permits pre-programmed functions to be performed on entry of one or more identification codes, comprising:

a key operation portion for enabling input of key strokes into said telephone set;

a memory which stores a plurality of preset identification numbers wherein each of said preset identification numbers has one or more pre-programed permitted functions associated therewith; and a control with a dial lock mechanism which permits operation of said telephone set only after said key operation portion is used to enter one of said plurality of preset identification numbers stored in said memory, wherein an operation permitted by said control is restricted to said one or more pre-programmed permitted functions which are associated with said one of said plurality of preset identification numbers.

18. A dial lock releasing method in a cellular telephone set which permits one or more pre-programmed functions to be performed on entry of one or more identification codes, the steps comprising:

storing in a memory associated with said telephone set a plurality of preset identification numbers and a plurality of pre-programmed permitted functions, wherein each of said plurality of preset identification numbers is associated with one or more pre-programed permitted functions of said plurality of pre-programmed permitted functions;

entering one of said plurality of preset identification numbers into said telephone set; and permitting operation of said telephone set after said step of entering is performed, said permitting step permitting only pre-pregrammed permitted functions of said one or more pre-programmed functions associated with said one of said plurality of preset identification numbers entered in said entering step to be performed.

19. A program for performing a dial lock releasing method in a cellular telephone set which permits one or more pre-programmed functions to be performed on entry of one or more identification codes, said program making a computer execute:

a process of storing in a memory assoicated with said telephone set a plurality of preset identification numbers and a plurality of pre-programmed permitted functions, wherein each of said plurality of preset identification numbers is associated with one or more pre-programed permitted functions of said plurality of pre-programmed functions;

a process of recognizing entry of one of said plurality of preset identification numbers into said telephone set; and a process of permitting operation of said telephone set only after recognizing entry of said one of said plurality of preset identification numbers, said process of permitting operation permits said one or more pre-programmed permitted functions which are associated with said one of said plurality of preset identification numbers to be performed.

* * * * *